US007647413B2

(12) United States Patent
Kirkland

(10) Patent No.: US 7,647,413 B2
(45) Date of Patent: *Jan. 12, 2010

(54) SYSTEM FOR PROVIDING ON-DEMAND MEDIA STREAMING FROM A USER'S OWN LIBRARY TO A RECEIVING DEVICE OF THE USER

(75) Inventor: Dustin C. Kirkland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 12/124,859

(22) Filed: May 21, 2008

(65) Prior Publication Data

US 2008/0216165 A1  Sep. 4, 2008

Related U.S. Application Data

(63) Continuation of application No. 10/637,033, filed on Aug. 7, 2003, now Pat. No. 7,395,339.

(51) Int. Cl.
G06F 15/16 (2006.01)
G06F 15/173 (2006.01)
G06F 15/177 (2006.01)
(52) U.S. Cl. .................. 709/229; 709/203; 709/219; 709/231
(58) Field of Classification Search ......... 709/200–203, 709/217–234

See application file for complete search history.

(56) References Cited

U.S. PATENT DOCUMENTS 5,926,624 A * 7/1999 Katz et al. ............... 709/217

(Continued)

FOREIGN PATENT DOCUMENTS

JP  2002123274  4/2002

(Continued)

OTHER PUBLICATIONS

Wired News: He Wants His My.mp3.com, Jun. 20, 2003, pp. 1-4. http://www.wired.com/news/business/0,1367,34816,00.html.

(Continued)

*Primary Examiner*—Haresh N Patel
(74) *Attorney, Agent, or Firm*—Yee & Associates, P.C.; Libby Z. Handelsman

(57) ABSTRACT

A system and method are provided for on-demand media streaming from a user's own media library to a user's receiving device that may be located in a different location from that where the media library is stored. The present invention provides an out-of-the box on-demand media server device that may be used by itself, in conjunction with a personal computer, or in conjunction with a personal home stereo system or video system. The on-demand media server includes security mechanisms that allow a user to establish a private server that only the user may communicate with and gain access to the user's media library. In one particular embodiment, a smart card or other removable media are used as a security device to ensure that access to the media files on the user's personal on-demand media streaming server is limited to the user. In addition, the system and method provides an on-demand conversion of the media in the user's personal media library to an appropriate format.

7 Claims, 8 Drawing Sheets

U.S. PATENT DOCUMENTS

| | | |
|---|---|---|
| 6,170,060 B1 * | 1/2001 | Mott et al. ............... 726/29 |
| 6,173,406 B1 | 1/2001 | Wang et al. |
| 6,248,946 B1 | 6/2001 | Dwek |
| 6,766,946 B2 | 7/2004 | Lida et al. |
| 6,839,759 B2 | 1/2005 | Larson et al. |
| 2001/0051996 A1 * | 12/2001 | Cooper et al. ............ 709/217 |
| 2001/0053945 A1 | 12/2001 | Hayashi et al. |
| 2002/0032019 A1 | 3/2002 | Marks et al. |
| 2002/0069263 A1 * | 6/2002 | Sears et al. ............... 709/218 |
| 2003/0047602 A1 * | 3/2003 | Iida et al. ................. 235/382 |
| 2003/0084144 A1 | 5/2003 | Lipinski |
| 2004/0107286 A1 * | 6/2004 | Larson et al. ............ 709/229 |
| 2004/0117845 A1 * | 6/2004 | Karaoguz et al. ......... 725/134 |
| 2006/0026271 A1 * | 2/2006 | Julia et al. ................ 709/223 |

FOREIGN PATENT DOCUMENTS

| | | |
|---|---|---|
| JP | 2002215632 | 8/2002 |
| WO | 0186842 | 11/2001 |
| WO | 02065764 | 8/2002 |

OTHER PUBLICATIONS

Wired News: MyMP3.com Nixes Major Lables, Jun. 20, 2003, pp. 1-2. http://www.wired.com/news/business/0,1367,36259,00.html.

* cited by examiner

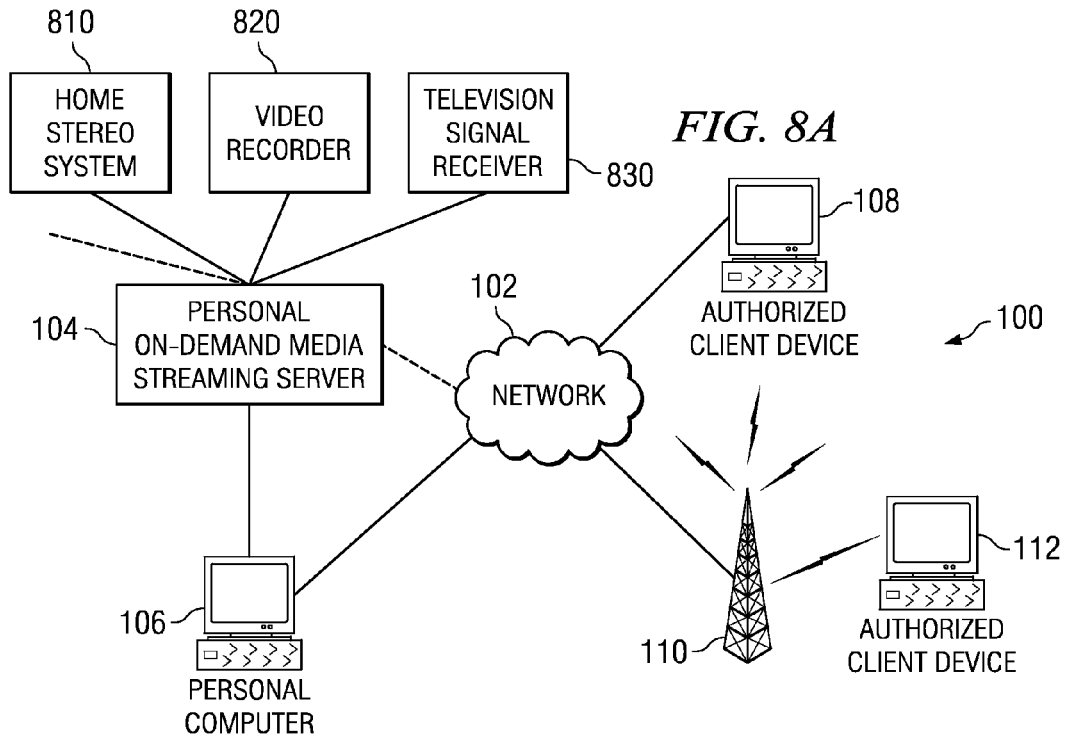
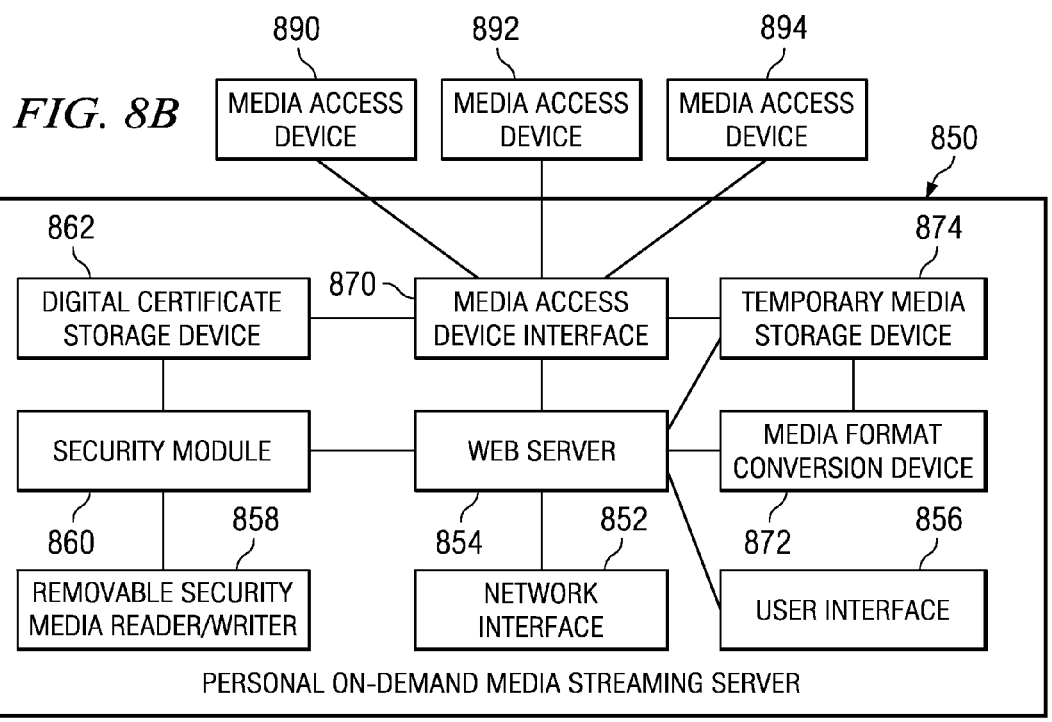

SYSTEM FOR PROVIDING ON-DEMAND MEDIA STREAMING FROM A USER'S OWN LIBRARY TO A RECEIVING DEVICE OF THE USER

CROSS REFERENCES TO RELATED APPLICATIONS

This application is a continuation of application Ser. No. 10/637,033, now U.S. Pat. No. 7,395,339, filed Aug. 7, 2003.

BACKGROUND OF THE INVENTION

1. Technical Field

The present invention is directed to an improved computing system. More specifically, the present invention is directed to a personal on-demand media streaming system and method.

2. Description of Related Art

The ability to gain access to various media types via the Internet has made it more prevalent in our society to use the digital medium as a mechanism for distributing media. For example, the Internet is used as a medium over which video, audio, graphical, and textual data are transmitted from source devices to destination devices.

One area where the use of the Internet is most prevalent, and most troublesome, is the transmission of music as audio data from a source device to one or more destination devices. The use of MP3 technology has allowed users to convert their audio recordings to a digital format that is easily transferable over the Internet. MP3 is an audio compression technology that is part of the MPEG-1 and MPEG-2 specifications. Developed in Germany in 1991 by the Fraunhofer Institute, MP3 uses perceptual audio coding to compress compact disc (CD) quality sound by a factor of 12, while providing almost the same fidelity. MP3 music files are played via software or a physical player that cables to the PC for transfer.

MP3 has made it feasible to download quality audio from the Internet very quickly, causing it to become a worldwide auditioning system for new musicians and labels. Established bands post sample tracks from new albums to encourage CD sales, and new bands post their music on MP3 sites in order to develop an audience. Unfortunately, however, MP3 has also allowed users to create digital versions of copyrighted works and distribute them to users who have not actually paid for the right to own or use the copyrighted work.

Similar compression techniques have been developed for other types of media as well. Movies, which may be in a DVD format, for example, may be converted to one or more compressed data files in an AVI format. Similarly, pictures may be distributed digitally in a compressed form, such as JPEG. All of these various methods of compressing media into data files that are of a size that is easily accessible over the Internet have increased the use of the Internet as a media source.

Today, many people have a large archive of media of various types, e.g., CDs, DVDs, digital pictures, and the like. However, in order to gain access to the content on this media, the person must have the physical copy of the media available to them at their current location. This may be a problem when a person has a large media library and wishes to have access to all of the media when away from the location where the media library is normally stored. For example, if a person has a library of 300 compact discs having music and other audio files thereon, and the person wishes to have access to all 300 compact discs from his work location, the person is required to bring all 300 compact discs to the work location in order to have access to them. In other words, physical access is required and the size of the library makes physical access impractical.

Some attempts have been made to alleviate this problem by providing third party source solutions. For example, the web site My.MP3.com provided a service by which a user may obtain access to a portion of a the third party service provider's library of MP3 files once the user proved that they had actually purchased a copy of the CD having the audio recording associated with the MP3 to which access is desired. This allowed a user to download the MP3 to any client computer.

The problem with this solution is that the user was forced to access the third party service provider's library of MP3s and did not actually have access to his/her own library of audio recordings. Thus, there was no assurance that a particular audio recording in the user's audio recording library would also be in the library of MP3s of the third party service provider. Moreover, the user did not have control over the use of the MP3s but was rather subject to the requirements and whims of the third party service provider, i.e. the user may have to pay for access to the MP3, the MP3 may be available one day but then not be available at a later time, and the like. In addition, the quality of the MP3 version of the audio recording could not be controlled by the user and was entirely up to the third party service provider. Moreover, a third party service provider may subject the user to unwanted advertisements and may collect information about the user's access to media files for use by other organizations without the user's knowledge.

The desire of users to have access to their own personal libraries of media from a variety of different locations is ever increasing in our entertainment based society. Therefore, it would be beneficial to have a method and system for providing on-demand media streaming from a user's own library to a user's receiving device so that the user may access his/her own library of media from a location remote from the location of the user's media library.

SUMMARY OF THE INVENTION

The present invention provides a system and method for on-demand media streaming from a user's own media library to a user's receiving device that may be located in a different location from that where the media library is stored. The present invention provides an out-of-the box on-demand media server device that may be used by itself, in conjunction with a personal computer, or in conjunction with a personal home stereo system or video system. The on-demand media server device includes a file server for accessing a set of files on a storage device, a web server that makes the files accessible via the file server available via the Internet, and a user interface that provides a mechanism by which a user can enter requests for access to files stored on the storage device. The on-demand media server includes at least one connection port for connecting to a high-speed Internet connection, and may include a connection port for connecting to a personal computer and a connection port for connecting to a stereo or video system.

The on-demand media server includes security mechanisms that allow a user to establish a private server that only the user may communicate with and gain access to the user's media library. These security mechanisms may include a device identifier authentication that is used to authenticate the device to which the user wishes the media to be streamed along with password-based, the use of secure socket layer (SSL) based communications, HyperText Transport Protocol Secure (HTTPS), and other security mechanisms that limit access to only the owner of the on-demand media streaming server. In this way, the user is assured that access to his/her media library is limited to only himself/herself or a select few persons to which he/she grants access.

In one particular embodiment, a smart card or other removable media are used as a security device to ensure that access to the media files on the user's personal on-demand media streaming server is limited to the user. For example, the media files may be stored on a storage system associated with the on-demand media streaming server and the on-demand media streaming server may be equipped with a smart card, or other type of removable media, reader/writer. The user may insert the smart card or removable media into the reader/writer and the on-demand media streaming server may transfer a digital certificate to the smart card or removable media and encrypted.

The digital certificate may be an indicator of which media files are accessible by a device having the smart card or removable media inserted therein. For example, a first digital certificate may be associated with a subgroup of the media files while another may be associated with all of the media files. In this way, if the user grants access to his/her personal media library to other persons, he/she may limit the access by the digital certificate provided to the other persons.

The smart card or removable medium is required for a remotely located device to gain access to the user's personal media library. Thus, the device from which a request is received for access to the user's media library must include a reader for the smart card or removable media. The digital certificate located on the smart card or removable media may be accessed via the reader and sent to the user's on-demand media streaming server for authentication. If the digital certificate is associated with a subgroup of the media files associated with the on-demand media streaming server, then an identifier of the media files to which access may be granted may be stored in association with a session identifier for the session established between the remote device and the on-demand media streaming server. Alternatively, the digital certificate may be checked with each media file being streamed to determine if that media file is part of the group that may be accessed by a device using the digital certificate.

In one embodiment of the present invention, the user may log onto his/her own personal on-demand media streaming server using his/her client device. The log on connection is facilitated via a wired or wireless Internet connection, a web browser application located on the client device, and one or more of the security mechanisms mentioned above. Upon a successful logon, the client device is provided with a user interface that provides options for selecting media to be streamed to the user's receiving device. These options may include simply selecting the audio files that are to be streamed directly, selecting a pre-established play list, select a streaming schedule, selecting a time at which the media stream should begin, a quality of the media stream to be provided, and the like. In addition, the user may make use of this interface to establish play lists, media streaming schedules, and the like.

Upon receiving a request for at least one media file from an authenticated client device, the on-demand media streaming server may begin streaming the requested media file to the client device that requested it. The media file may be already stored in a storage device in an appropriate format for transmission to the client device, e.g., MP3, AVI, JPEG, etc. Alternatively, an on-demand conversion of the media to an appropriate format may be used. For example, the on-demand media streaming server of the present invention may be associated with a media reader, such as a CD changer, a DVD player, a video cassette recorder, a television, a satellite television receiver, a hard disk based television recorder, or the like.

The on-demand media streaming server, in response to receiving a request for media that is present in one of these readers, may access the media via the appropriate reader, convert at least a portion of the media to a compressed format, e.g., MP3, AVI, JPEG, and stream that portion to the requesting client device. As more portions of the media become available for streaming through this process, the additional portions may be streamed to the client device which stores the portions in a buffer so that a seamless presentation of the media is provided at the client device.

In this way, a user may have access to their personal media library via a personal on-demand media streaming server that they own. Security mechanism are utilized to ensure that access to the personal media library is limited to only the user or a small select group of persons to whom the user has granted expressed permission to access portions of the user's personal media library. In addition, the present invention may provide for on-demand conversion of media to a streaming format when used in conjunction with a media reader. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8A is an exemplary diagram of an alternative embodiment of a distributed data processing system in which the present invention may be implemented;

FIG. 8B is an exemplary block diagram of a personal on-demand media streaming server in accordance with the embodiment illustrated in FIG. 8A;

DETAILED DESCRIPTION OF THE PREFERRED EMBODIMENT

Figure 2:
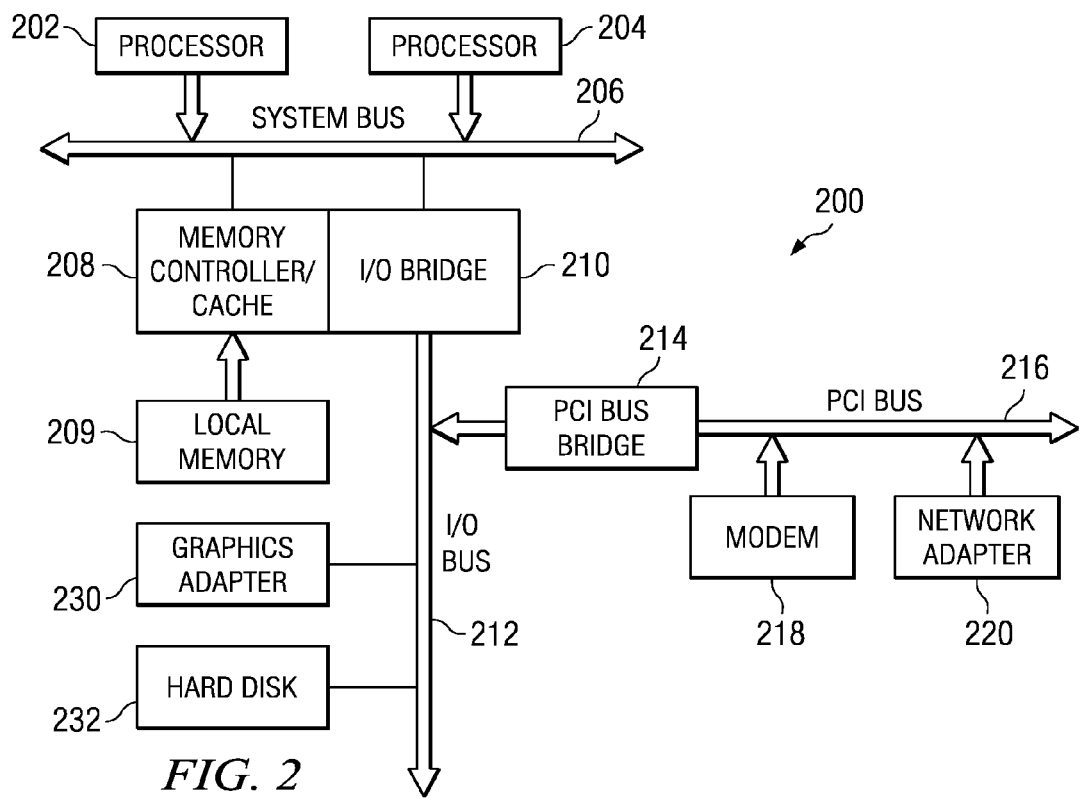
FIG. 2 is an exemplary block diagram of a personal on-demand media streaming server computing device in which the present invention may be implemented.
Figure 3:
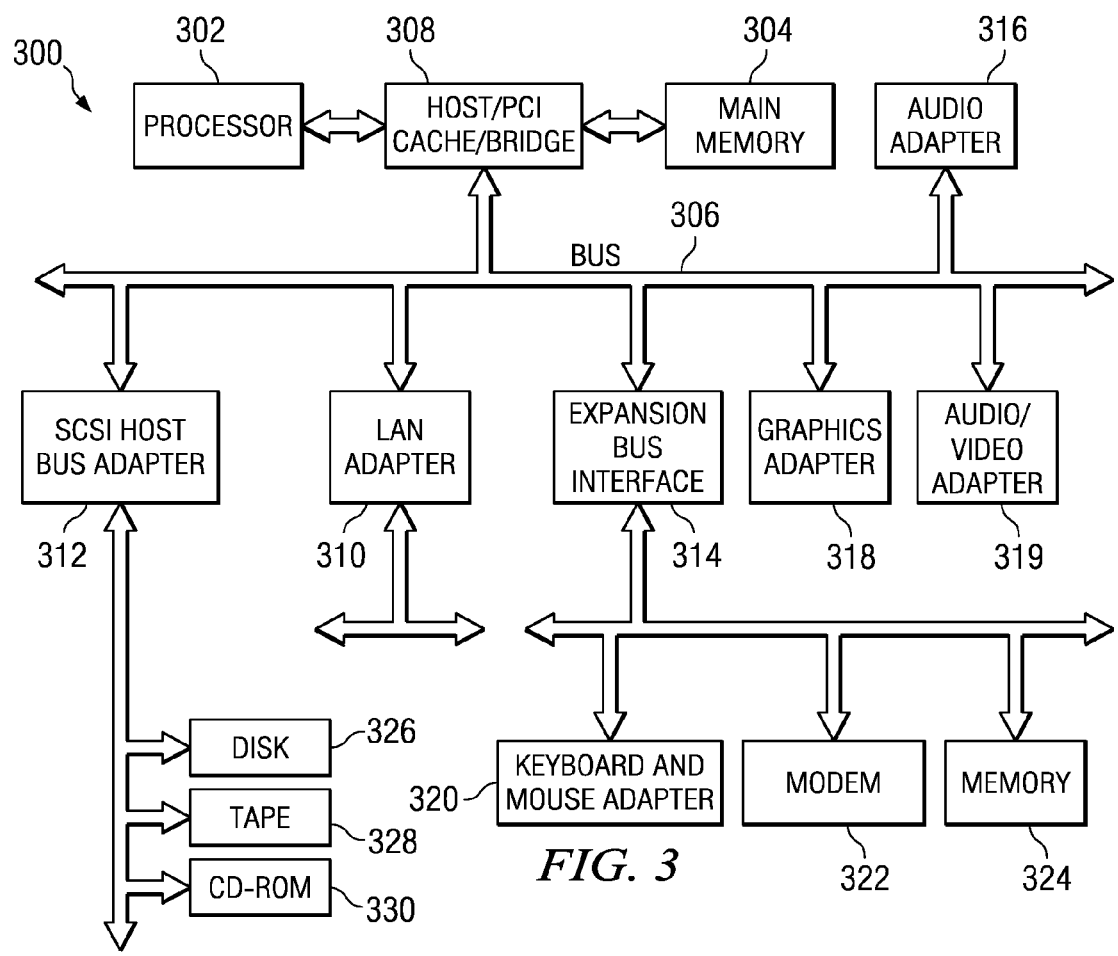
FIG. 3 is an exemplary block diagram of a client computing device in which the present invention may be implemented.

As mentioned above, the present invention provides a personal on-demand media streaming system and method. Thus, the present invention is ideally suited for use with a distributed data processing system in which a network, such as the Internet, is utilized as a data transfer medium. Thus, the following diagrams in FIGS. 1-3 are intended to provide a background regarding the distributed data processing environment in which the present invention may be implemented as well as the computing devices in which the present invention may be implemented.

Figure 1:
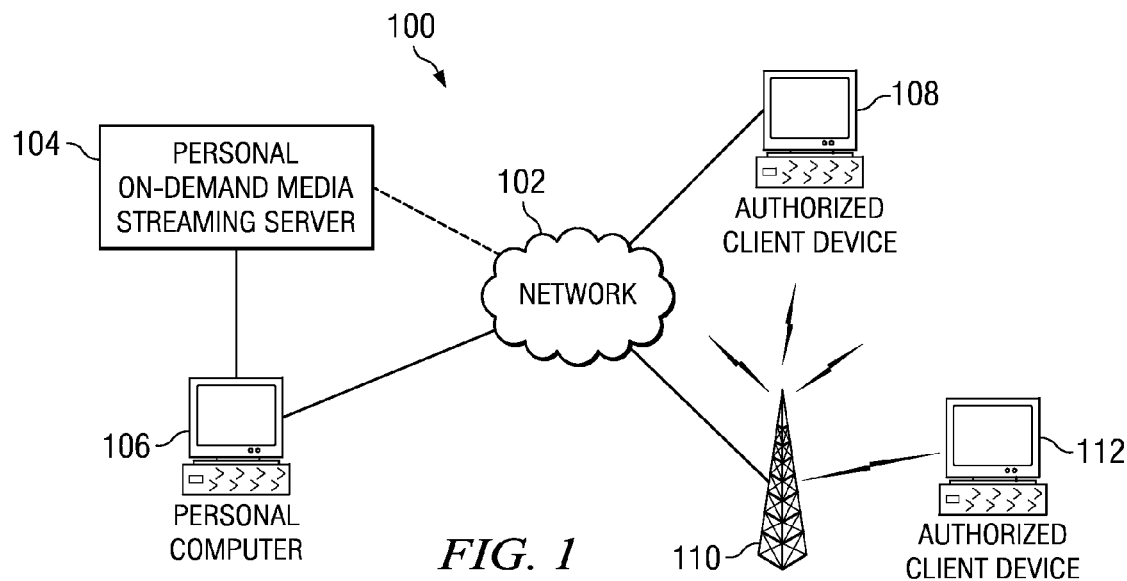
FIG. 1 is an exemplary block diagram of a distributed data processing system in which the present invention may be implemented.

With reference now to the figures, FIG. 1 depicts an exemplary representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, personal on-demand media streaming server 104 is connected to network 102 either directly or via a personal computer 106. In addition, client devices 108 and 112 are connected to network 102 either directly or through wireless means, such as wireless network base station 110. These clients 108, and 112 may be, for example, personal computers, network computers, personal digital assistants, digital wireless telephones with Internet capability, wireless enabled automobile stereo systems, wireless enabled MP3 or digital music players, in-car video systems, computerized alarm clocks, intercom systems in homes, kitchen radio devices and other household appliances that would traditionally play physical media or receive radio and/or television signals, or the like. In short, the client devices 108 and 112 may be any data processing device that is capable of outputting streaming media.

In the depicted example, personal on-demand media streaming server 104 provides streaming media data, to client devices 108 and 112 upon request and authentication of the client devices 108 and 112. Client devices 108 and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), a wide area network (WAN), a wireless data communication network, or any combination of the above. FIG. 1 is intended as an example, and not as an architectural limitation for the present invention.

Referring to FIG. 2, a block diagram of a data processing system that may be implemented as a personal on-demand media streaming server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. One or more modems may be connected to PCI local bus 216. Typical PCI bus implementations will support four PCI expansion slots or add-in connectors. Communications links to clients 108 and 112 in FIG. 1 may be provided through modem 218 or network adapter 220 connected to PCI local bus 216 through add-in boards. The personal on-demand media streaming server 104 may be coupled directly to the network 102 via the modem 218 or network adapter 220, or may be indirectly connected to the network 102 via a personal computer 106 that it is connected to via the network adapter 220 or other type of device interface.

A memory-mapped graphics adapter 230 and hard disk 232 may also be connected to I/O bus 212 as depicted, either directly or indirectly. Similarly, a CD-ROM drive 250, DVD-ROM drive 252, and other media access device interfaces 253-254 may be connected to the I/O bus 212 in order to obtain access to media files stored on physically removable media.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, a separate dedicated personal on-demand media streaming server running an operating system, such as the Advanced Interactive Executive (AIX) operating system or LINUX operating system. Alternatively, the personal on-demand media streaming server may be integrated into, such as via an expansion board or other pluggable device, or connected to a personal computing device via a direct connection or local network. In such an embodiment, the personal on-demand media streaming server may perform the functionality of the present invention while relying on the personal computer for storage of media files and connection to the network and other devices. In such an embodiment, the operating system of the personal computer may communicate with an on-demand media streaming server via device drivers or the like.

With reference now to FIG. 3, a block diagram illustrating a client data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used.

Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection.

In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP or Windows CE which are available from Microsoft Corporation, LINUX, the Palm operating system, or other types of known operating systems for wired and wireless computing devices. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The data processing system 300 is illustrated as a personal computing device. However, the data processing system 300 may be any type of data processing device that is capable of requesting, receiving and outputting streaming media. For example, the data processing device may be embodied as a personal digital assistant (PDA) device, a hand-held computer, a mobile telephone, a wireless enabled automobile stereo system, a wireless enabled personal MP3 or other media format player, a wireless enabled automobile video system, computerized alarm clocks, intercom systems in homes, kitchen radio devices and other household appliances that would traditionally play physical media or receive radio and/or television signals, or the like. No limitation as to the type of data processing system that may be used with the present invention, other than having the capability of requesting, receiving and outputting streaming media, is intended or implied by the depiction in FIG. 3.

As mentioned above, the present invention provides a personal on-demand media streaming server that is accessible only by an owner of the personal on-demand media streaming server via an authorized client device or a small group of other users that are explicitly identified by the owner as having permission to access media files via the personal on-demand media streaming server. In a preferred embodiment, the personal on-demand media streaming server is intended to be a stand-alone device that is coupled to a network, e.g., the Internet, either directly or through a personal computing device. Alternatively, the personal on-demand media streaming server may be embodied as software running on a personal computing device that transforms the personal computing device into a personal on-demand media streaming server. Regardless of the particular embodiment chosen the functionality of the present invention as described hereafter is the same.

Referring again to FIG. 1, the personal on-demand media streaming server 104 performs the operations of the present invention as described in greater detail hereafter and may make use of a storage device (not shown) that is either integrated into the personal on-demand media streaming server 104, a storage device of the personal computing device 106 to which it is coupled, or a separate storage device coupled to the personal on-demand media streaming server 104 in which media files are stored. The media files may be audio, video, or graphical files that are stored in a compressed format that is suitable for streaming, e.g., MP3, AVI, etc. The media files are preferably copies of media owned by the user of the present invention and which have been converted to the compressed format. For example, the media files may be MP3 formatted versions of songs from compact discs owned by the user, AVI files corresponding to movies or other viewable content from DVDs owned by the user, or the like. The media may be converted to the compressed format using known techniques, a process sometimes referred to as "ripping" the media to a compressed format.

The personal on-demand media streaming server 104 responds to log on requests and requests for media files from client devices 108 and 112. The personal on-demand media streaming server 104, or personal computer 106, may have a network address, e.g., an Internet Protocol (IP) address associated with it that is used by browser software on the client devices to gain access to the personal on-demand media streaming server 104. For example, a user of a client device 108 may enter a domain name for the personal on-demand media streaming server 106 which is then mapped by a domain name server to the IP address associated with the personal on-demand media streaming server 104.

In response to receiving a log on request from a client device 108, the personal on-demand media streaming server 104 requests authentication information from the client device 108. This authentication information is authentication information that not only authenticates the particular user of the client device 108, but also the client device 108 itself. That is, the authentication information may require a user ID and password to authenticate the user and a device ID associated with the client device 108.

The user may not be informed of the device ID of the client device 108 and it may be automatically retrieved from the client device 108. For example, a MAC address of a network card may be utilized as a device identifier that is checked by the personal on-demand media streaming server 104 in order to authenticate the log on request from the client device 108. Alternatively a Mobile Identification Number (MIN) or the like may also be utilized.

The MAC address, MIN, or other device identifier must be registered with the personal on-demand media streaming server 104 prior to the log on request being received in order for the log on request to be authenticated. This may require that the owner of the personal on-demand media streaming server 104 perform a registration process for registering the client device 108. This registration process may require that personal information about the owner of the personal on-demand media streaming server 104, e.g., maiden name, social security number, place of birth, personal preferences, or other information generally known only to the owner, be entered along with the automatic detection of the device ID. This check helps to ensure that the owner of the personal on-demand media streaming server 104 and the owner of the client device 108 are the same person since it is much easier for the same person to register his/her client devices 108 and 112 with the personal on-demand media streaming server 104 than it is for another person, that must first obtain permission from the owner of the personal on-demand media streaming server 104, to register his/her devices with the personal on-demand media streaming server 104 using information about the owner of the personal on-demand media streaming server 104.

If the personal on-demand media streaming server 104 determines that the user ID/password and the device identifier match stored values, then the log on request is authenticated and the user of the client device 108 is permitted to request media to be streamed from the personal on-demand media streaming server 104 to the client device 108. The personal on-demand media streaming server 104 may provide one or more graphical user interfaces, such as in the form of web pages, to the client device 108 through which the user of the client device 108 may select media files for streaming to the client device 108. These interfaces may include, for example, selectable options and fields through which the user of the client device 108 may enter information regarding particular media files to stream, a pre-established play list (a collection of media files having an order) to be streamed, a media streaming schedule (a collection of media files having an order and designated streaming times) to be streamed, a quality of the media stream (e.g., large size, medium size, small size for video streams), and the like. In one embodiment, the graphical user interfaces provide a file and directory tree through which the user of the client device 108 may navigate to select the media files that he/she wishes to have streamed to the client device 108. The interfaces may further provide a mechanism through which the user of the client device may establish new play lists and media streaming schedules and have them stored in the personal on-demand media streaming server 104.

The selected options and inputs into the fields of the graphical user interfaces are used to generate media streaming requests that are provided to a file server of the personal on-demand media streaming server 104. The file server retrieves the requested media files from a media file library storage device (not shown) and makes them available for streaming by the personal on-demand media streaming server 104. The personal on-demand media streaming server 104 then streams the media files to the client device 108.

It is important to note that the personal on-demand media streaming server 104 is a personal server in nature. That is, rather than a server that is generally accessible by the public, or even a private server on a local area network or virtual private network, the personal on-demand media streaming server 104 is generally only accessible by the owner of the personal on-demand media streaming server 104. There are some cases where the owner of the personal on-demand media streaming server 104 may grant temporary access to other individuals, but this is intended to be a rare case.

Thus, the security mechanisms of the personal on-demand media streaming server 104 are intended to ensure that only the owner of the personal on-demand media streaming server 104 gains access to the media files managed by the personal on-demand media streaming server 104. This is why the client devices 108 that are granted access to the media files must be client devices that have been previously registered by the owner of the personal on-demand media streaming server 104 as being authorized client devices. Furthermore, the user must enter a personal identifier and password in order to verify that it is the actual owner that is requesting access to the personal on-demand media streaming server 104. Thus, by use of the security mechanisms of the personal on-demand media streaming server 104, the present invention requires that the personal on-demand media streaming server 104 and client device 108 be owned by the same person and that the owner be the person using the client device 108 at the time the request for media streaming is received.

In addition, the personal on-demand media streaming server 104 of the present invention, in a preferred embodiment, is intended to be an out-of-the-box personal on-demand media streaming server. That is, the personal on-demand media streaming server 104 is preconfigured during manufacture to include a file server, a web server, and user interfaces that are usable to access media files for streaming of the media files to an authorized client device. The personal on-demand media streaming server 104 may further include a storage device upon which a user may store media files to which streaming access will later be requested. The media files may be stored on the storage device by way of one or more communications ports that may be used to couple a media storage system, such as an MP3 player, laptop computer, hand held computer, personal computer, or the like, to the personal on-demand media streaming server 104 for transfer of the media files.

The owner of the personal on-demand media streaming server 104 may further configure the server 104 to permit only his/her access to the media files by using a registration process that provides network address information and information for use in authenticating the user and the client devices that the user may use to access the media files. Such registration may be performed through a personal computer or the like that is coupled to the personal on-demand media streaming server 104. Once configured in this manner, and once media files are transferred to the storage device of the personal on-demand media streaming server 104, the personal on-demand media streaming server 104 is ready to operate as a stand-alone personal server.

Alternatively, as previously mentioned, the personal on-demand media streaming server 104 may be used in conjunction with a personal computer such that transfer of the media files to a local storage device of the personal on-demand media streaming server 104 and setting up of network address information is not necessary. The registration of information for use in authenticating the user and the client devices is still necessary in this embodiment, however.

Thus, by simply coupling the personal on-demand media streaming server 104 to a network connection or personal computer and a quick configuration and optional file transfer procedure, the personal on-demand media streaming server 104 is made ready for operation on the network. This eliminates the need for specially trained personnel that are familiar with administration of servers and allows any person to quickly establish their own personal server in their home or office.

Figure 4:
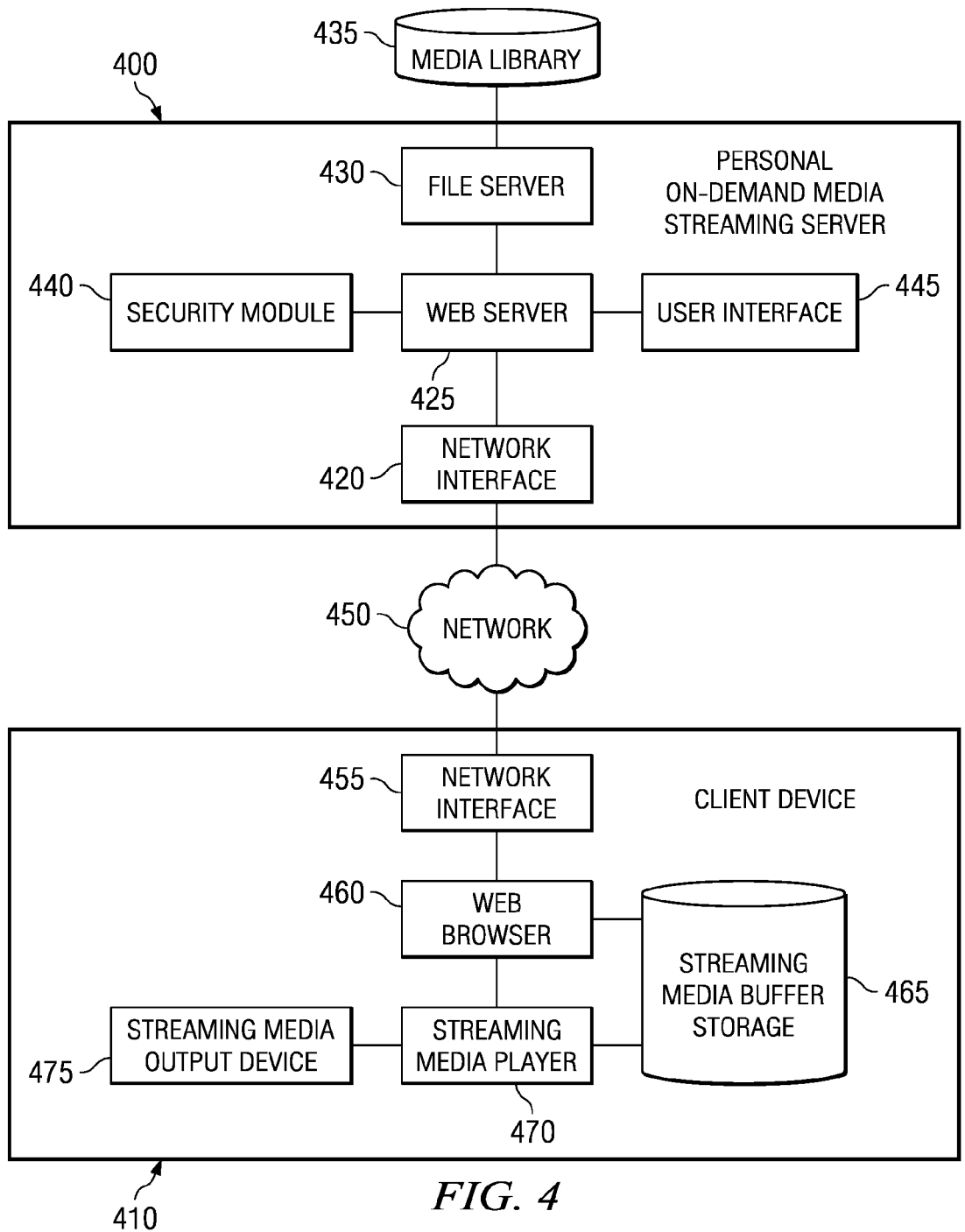
FIG. 4 is an exemplary diagram illustrating the primary operational elements of the present invention.

FIG. 4 is an exemplary diagram illustrating the primary operational elements of the present invention. As shown in FIG. 4, the personal on-demand media streaming server 400 includes a network interface 420, a web server 425, a file server 430, a security module 440, and a user interface 445. The elements 420-445 may be implemented in hardware, software, or any combination of hardware and software. In a preferred embodiment, the elements 420-445 are implemented as software instructions executed by one or more processors.

The network interface 420 provides an interface through which the personal on-demand media streaming server 400 may send and receive data via one or more networks. The file server 430 provides a mechanism for accessing data stored in an associated data storage device. This data may be, for example, music, videos, pictures, and other types of media that are stored in a data format on an arbitrarily large hard disk or series of hard disks.

The web server 425 provides a mechanism that makes the data accessible via the file server 430 available to client devices over the one or more networks via the network interface 420. In the interest of security and privacy, the web server may be configured to use the Secure Socket Layer (SSL) encryption technology, HyperText Transport Protocol Secure (HTTPS), or other type of encryption/protocol, to protect data transmitted to and from the web server 425. This helps to prevent an interloper from gaining access to data streams being sent from the web server 425 to a client device over the one or more networks.

The security module 440 is used to perform security checks to ensure that a client device and a user of a client device are the authorized user and device to which on-demand media streaming is to be made available. These security checks may include, for example, a password and user ID check, a device identifier check, and the like. Any security mechanism that is used to ensure that both the user and the device are permitted to access media files via the web server 425 and file server 430 may be used without departing from the spirit and scope of the present invention.

The user interface 445 is used to provide one or more graphical user interfaces to client devices through which a user of a client device may access media files via the web browser 460 and the file server 430. The graphical user interfaces may include one or more interfaces that provide a graphical tree illustrating the media files that are accessible via the file server 430, selectable options for selecting the media files to be streamed to a client device, and fields for entry of information identifying media files to be streamed.

The client device 410 includes a network interface 455, a web browser 460, a streaming media buffer storage 465, a streaming media player 470, and a streaming media output device 475. The elements 455-475 may be implemented as software, hardware, or any combination of software and hardware. In a preferred embodiment, the elements 455-475 are implemented as software instructions executed by one or more processors.

The network interface 455 is an interface that provides a connection with one or more networks and allows data to be transmitted and received by the client device 410. The web browser 460 is an application that permits a user of the client device 410 to access servers and resources via one or more networks, such as the Internet. The streaming media buffer storage 465 provides a temporary storage of streaming media data prior to the data being output by the streaming media player 470 to a streaming media output device 475. The streaming media player 470 is a software application that is capable of processing streaming media data such that it is output as video, audio, images, or the like. The streaming media output device 475 may be any type of media output device including audio output devices, video and image output devices, or the like.

Figure 5:
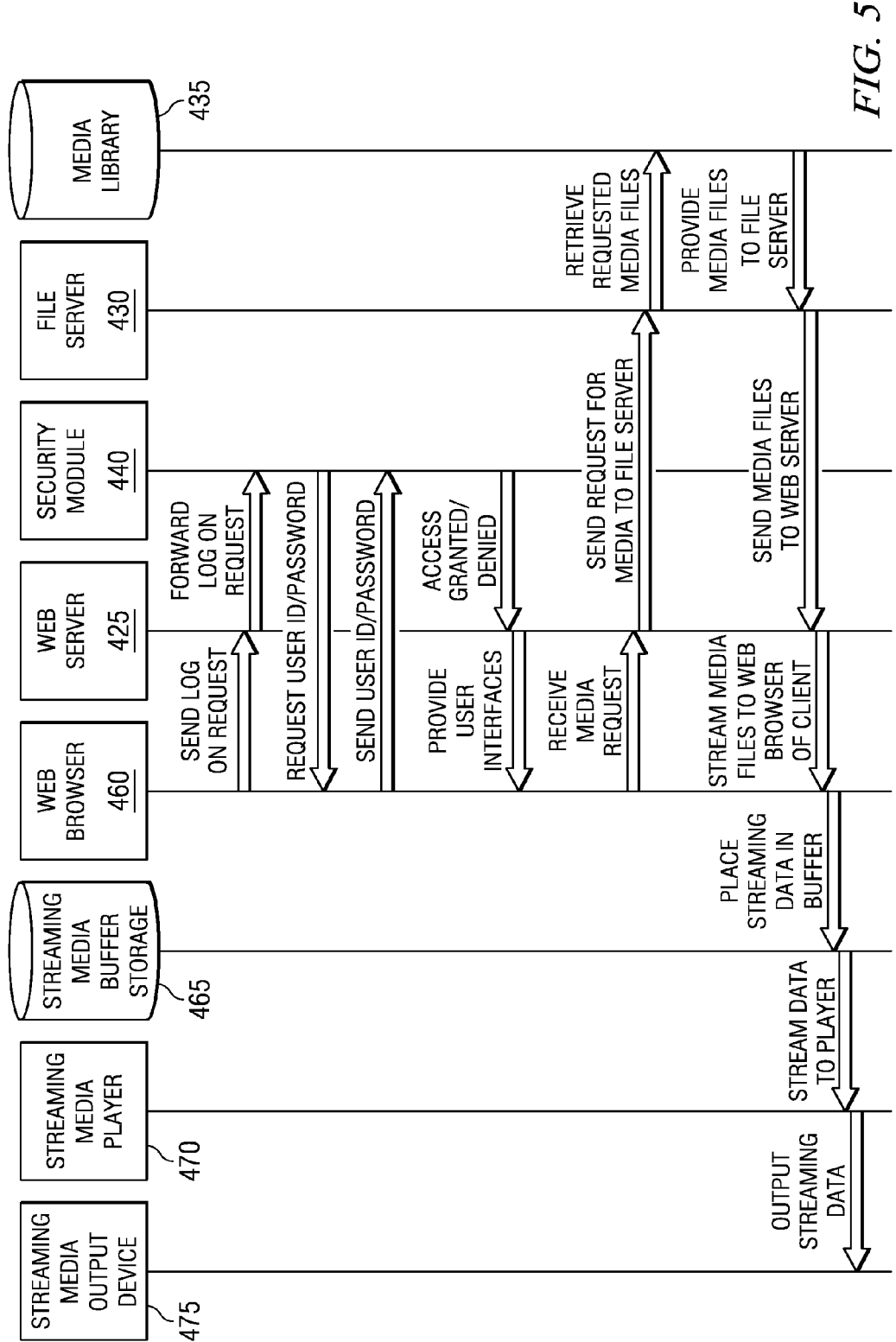
FIG. 5 is an exemplary message flow diagram illustrating a message flow for requesting and streaming media to a client device.

The operation of the present invention in terms of the operational elements depicted in FIG. 4 will be described with reference to the message flow diagram illustrated in FIG. 5. In operation, the user of the client device 410 sends a log-on request to the personal on-demand media streaming server 400 via the web browser 460 and one or more networks. The web server 425 of the personal on-demand media streaming server 400 receives the log-on request and forwards the log-on request to the security module 440. The log-on request includes a device identifier that is automatically inserted into the header of the log-on request data packets. This device identifier is verified by the security module 440 as being a device that has been registered as being an authorized device to which media files may be streamed.

If the device identifier identifies an authorized device, the security module 440 transmits a request for a user ID and password to the web browser 460. The user of the client device may then enter a user ID and password and transmit this information back to the security module 440. The security module 440 verifies the information received from the client device and either grants or denies access to media files based on this verification.

If access is granted, the web server 425 provides one or more user interfaces through which a user of the client device may enter a request for media files. These user interfaces, as previously mentioned, may include fields and selectable options through which a user may select media files, play lists, media streaming schedules, and the like. The user of the client device may enter the appropriate information into the user interfaces and transmit the information back to the web server 425.

Upon receiving the request for media information, the request is forwarded from the web server 425 to the file server 430. The file server 430 then requests the media files from the media library storage device 435. The media files are provided to the file server 430 and are then provided to the web server 425. The web server 425 streams the media files to the web browser 460 on the client device.

The client device receives the media file stream and stores the data in a streaming media data buffer storage 465. The streaming media player 470 reads the data from the streaming media data buffer storage 465 and presents it as output to the streaming media output device 475.

Thus, with the present invention, a user may establish his/her own personal on-demand media server that has access to his/her own personal library of media files. The user may register the client devices that may be used to gain access to the media files and register a user ID and password that is used to ensure that the user of these devices is the person that owns the personal on-demand media server and the client devices.

The media files may a accessible by client devices from any location as long as the client devices are registered as authorized client devices and have a communication link that may be used to gain access to the personal on-demand media streaming server. Thus, the client device may be a mobile wireless computing device, a wired computing device, computerized alarm clocks, intercom systems in homes, kitchen radio devices and other household appliances that would traditionally play physical media or receive radio and/or television signals, or the like. For example, the client device of the present invention may be a wireless enabled car stereo systems, a wireless enabled car video system, a wireless telephone device, a wireless laptop or portable computer, a personal computer, or the like. Thus, for example, a wireless enabled stereo system may be used in an automobile to log-on to the personal on-demand media streaming server of the present invention and download a media stream of audio files from a home based server. Similarly, video media files may be accessed from a home base server via an automobile based wireless enabled video system. Other similar uses of the present invention may be made without departing from the spirit and scope of the present invention.

Thus, the present invention permits a private server/client session to be established in order to access a private library of media files. In order to provide greater security in ensuring that the personal on-demand media streaming server is only accessed by an owner of the personal on-demand media streaming server, an alternative embodiment of the present invention includes a mechanism for ensuring personal physical possession of a device that is only made available to a person that has direct physical access to the personal on-demand media streaming server and the client device used to access the media files via the personal on-demand media streaming server.

Figure 6:
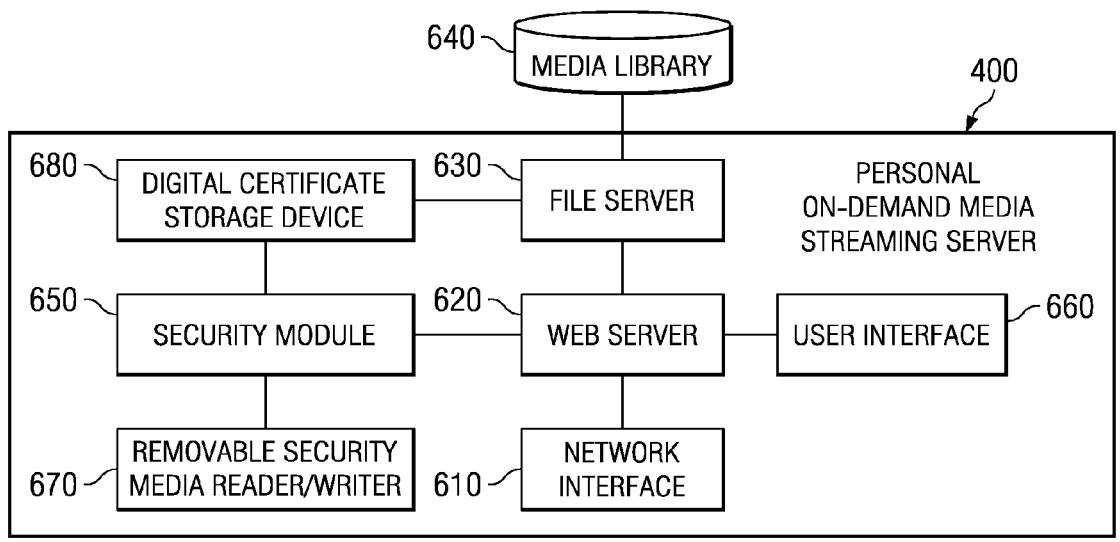
FIG. 6 is an exemplary diagram of an alternative embodiment of a personal on-demand media streaming server according to the present invention.

FIG. 6 is an exemplary diagram of an alternative embodiment of a personal on-demand media streaming server according to the present invention. The primary difference between this embodiment of a personal on-demand media streaming server and the previously described embodiments is that a mechanism is provided for ensuring that the user of the client device that is attempting to access media files via the personal on-demand media streaming server is in physical possession of a digital certificate that confirms that the user is an authorized user of the personal on-demand media streaming server.

As shown in FIG. 6, the personal on-demand media streaming server 600 includes a network interface 610, a web server 620 a file server 630, a security module 650, a user interface 660, a removable security media reader/writer 670, and a digital certificate storage device 680. The network interface 610, web server 620, file server 630, and user interface 660 are similar to elements 420-430 and user interface 445 of FIG. 4. The primary difference between the embodiment illustrated in FIG. 6 and that of FIG. 4 lies in the removable security media reader/writer 670, the digital certificate storage device 680 and the operation of the security module 650, as discussed hereafter.

In order to ensure that the user of a client device requesting access to media files via the personal on-demand media streaming server 600, this embodiment of the present invention requires that the user physically possess a physical media upon which a digital certificate or other authentication device is present. The media may be any type of removable and portable media upon which data may be stored. Examples of such media include smart cards, floppy disks, CD-ROM discs, DVD-ROM discs, USB drives, and the like.

Upon initialization of the personal on-demand media streaming server, or at some later time when the owner of the personal on-demand media streaming server deems it appropriate, the security module 650 of the personal on-demand media streaming server 600 may be used to generate a digital certificate or other authentication data. This digital certification is written to a removable media via the removable security media reader/writer 670. In addition, the digital certificate is written to a local digital certificate storage device 680. The digital certificate may be encrypted using any known encryption mechanism when writing it to the removable security media in order to provide added security.

The digital certificate may be associated with the entire media file library stored on the media library storage 640 or may be associated with only a portion of the media library storage 640. Thus, for example, an owner of the personal on-demand media streaming server 600 may designate a first digital certificate for a first portion of a set of audio files in the media library storage 640, a second digital certificate for a second portion of the set of audio files in the media library, and a third digital certificate for the video media files in the media library. In this way, different digital certificates may be associated with different portions and types of media files and may be distributed via physical media to a select few users.

Once the digital certificate is transferred to the removable security media, the removable media may be removed and used by a user of a client device in order to obtain access to at least a portion of the media files in the media library storage device 640. When the user of a client device wishes to gain access to the media library storage 640, the user must insert the removable security media into the client device in order for authentication to succeed. Thus, only persons that have a physical copy of the removable security media and are accessing the personal on-demand media streaming server 600 via a registered client device may actually obtain access to media files in the media library storage 640.

Figure 7:
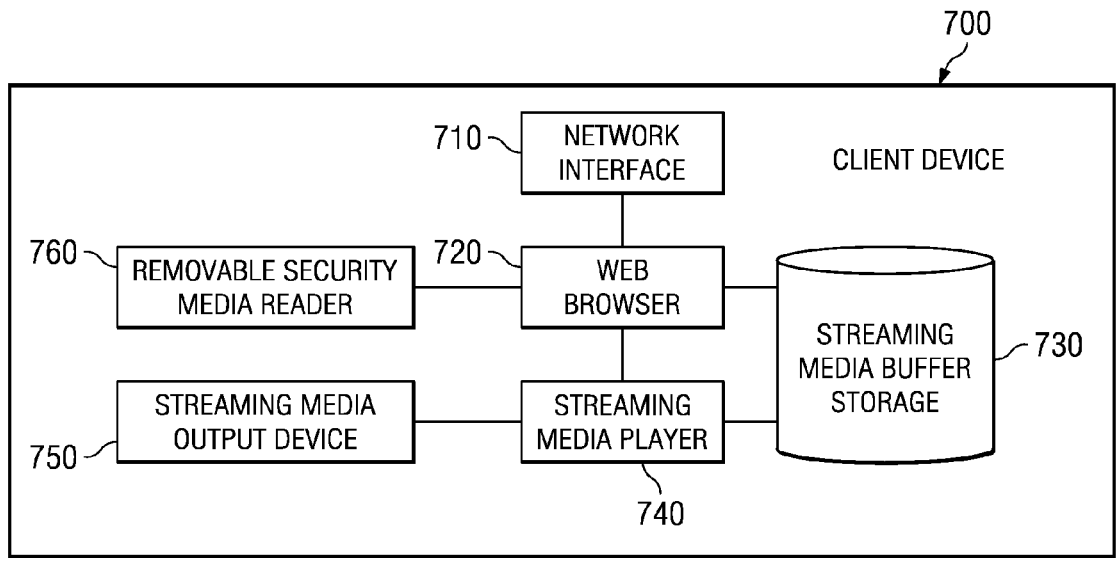
FIG. 7 is an exemplary diagram of an alternative embodiment of a client device according to the present invention.

FIG. 7 is an exemplary diagram of an alternative embodiment of a client device according to the present invention. As shown in FIG. 7, the client device 700 includes a network interface 710, a web browser 720, a streaming media buffer storage 730, a streaming media player 740, a streaming media output device 750, and a removable security media reader 760. The elements 710-750 are similar to the elements 455-475 of FIG. 4. The primary difference between the client device of FIG. 7 and the client device of FIG. 4 is the removable security media reader 760 and the operation of the web browser 720 with regard to the removable security media reader 760.

With this embodiment, the web browser 720, either automatically with each log-on request, or in response to a request from the personal on-demand media streaming server, retrieves the encrypted digital certificate and transmits it to the personal on-demand media streaming server for authentication. The web browser 720 may be configured such that only the removable security media reader 760 may be accessed to obtain the encrypted digital certificate. This helps to ensure that the encrypted digital certificate is not copied to a local storage device and used to perform the authentication. In addition, parameters may be set in association with the data file storing the encrypted digital certificate, and/or the client device, that precludes the encrypted digital certificate from being copied to other media or to the client device itself.

Moreover, since the encrypted digital certificate on the removable security media is not the only required security information, but in addition the client device and user ID/password must also be authenticated, it is unlikely that an unauthorized user will have access to all of this information. As a result, a secure personal private communication and access to the personal on-demand media streaming server is ensured by the security mechanisms of the present invention.

It should be noted that the client device is equipped with a removable security media reader 760 that is only capable of reading the removable security media. Thus, the client device 700 is incapable of writing a removable security media as the personal on-demand media streaming server 600 may. In a preferred embodiment, the removable security media is a smart card that is written to by the personal on-demand media streaming server 600 and is utilized by the owner of the personal on-demand media streaming server 600 to access the media files stored on the media library storage 640 from remotely located client devices, such as client device 700. Thus, through the mechanisms of the present invention, a user may gain access to a personal library of media files from remote locations while ensuring that only the user, or a select few persons specifically authorized by the user, is able to access the media files via the personal on-demand media streaming server 600.

FIG. 8A is an exemplary diagram of an alternative embodiment of a distributed data processing system in which the present invention may be implemented. The previous embodiments have been described in terms of the media files being stored in a media library storage device 640 in a format suitable for streaming, e.g., MP3, AVI, or the like. However, the present invention is not limited to such. FIG. 8A illustrates an embodiment in which media information is dynamically converted to a streaming format and streamed to a client device on-demand.

As shown in FIG. 8A, the personal on-demand media streaming server 104 is coupled to a plurality of media access devices 810-830. These media access devices 810-830 may include, for example, a home stereo system 810, a video player/recorder 820, a television signal receiver 830, or the like. For example, the home stereo system 810 may include a compact disc changer, an MP3 player, and the like. The video player/recorder 820 may include, for example, a video cassette player/recorder, a DVD player/recorder, a hard-disk based player/recorder, or the like. The television signal receiver 830 may include, for example, a standard antenna-based television receiver, a satellite dish and receiver, a cable connection and receiver, or the like.

The personal on-demand media streaming server 104 includes interfaces for receiving signals from these various media access devices and converting these signals into a data of a streamable format. In addition, these interfaces permit the personal on-demand media streaming server 104 to send command signals to the media access devices in a format that is understandable by the media access devices. That is, for example, the signals may be sent having codes such as those decipherable from an infrared remote control associated with the media access devices. Thus, from the stand-point of the media access devices, the command is as if it were received from a remote control device rather than the personal on-demand media streaming server 104.

Thus, for example, the a user of a client device 108 may log-on to the personal on-demand media streaming server 104 and send a play list, using the user interfaces provided by the personal on-demand media streaming server 104, to thereby request a series of audio files be streamed to the client device 108. The client device 108 may be, for example, a wireless enabled car stereo system having a memory and/or hard drive, as well as having an operating system and web browser for connecting to the personal on-demand media streaming server 104.

Upon receiving the play list from the client device 108, the personal on-demand media streaming server 104 sends control signals to the home stereo system 810 to thereby load and begin playing the selected audio, e.g., songs. In response, the home stereo system 810 may load the selected compact disc into a reader, begin reading of the data from the compact disc, and outputting the audio data to the personal on-demand media streaming server 104. The personal on-demand media streaming server 104 may then convert the received audio data to an MP3 or other format suitable for streaming. As portions of the audio data are ready for streaming, the data is streamed to the client device without requiring that all of the audio data for the selection be converted.

A similar operation may be performed with regard to video cassettes, DVDs, and other recorded video/audio data owned by the user. Thus, the user may acquire a library of recorded video and audio data on various media, such as compact disc, video cassette, and DVD, and be able to access these media from a remote location.

With regard to television signals, the present invention permits a user to obtain a schedule of programming, or simply receive the televisions signals being received by the television signal receiver 830, at a remote location. If a schedule of programming is available, the personal on-demand media streaming server 104 may present this schedule as part of the user interfaces presented to the client device. In this way, the user of the client device may select programs of interest from the schedule and thereby generated a schedule of streaming media.

When the selected programs begin to be received by the television signal receiver 830, the personal on-demand media streaming server receives these signals as well and converts them to an appropriate format, such as AVI, for streaming to the client device. This streaming does not require that the entire program be stored prior to the streaming but the program is streamed as predetermined portions of the program are received. That is, once a determined amount of data is received, the data is streamed to the client device and output via a streaming media player and streaming media output device. In this way, a user of a remotely located client device may obtain access to television programming previously only available at a home location.

FIG. 8B is an exemplary block diagram of a personal on-demand media streaming server in accordance with the embodiment illustrated in FIG. 8A. As shown in FIG. 8B, the personal on-demand media streaming server 850 according to this embodiment of the present invention includes a network interface 852, a web server 854, a user interface 856, a removable security media reader/writer 858, a security module 860, a digital certificate storage device 862, a media access device interface 870, a media format conversion device 872, and a temporary media storage device 874. The elements shown in FIG. 8B are similar to the elements of previous embodiments with the exception of the media access device interface 870, the media format conversion device 872, and temporary media storage device 874.

The media access device interface 870 provides the required functionality of permitting the sending of command signals to the media access devices 890-894 as well as receive signals from the media access devices 890-894. The temporary media storage device 874 provides for temporary storage of signal data received via the media access device interface 870 so that this data may be converted to a streamable format. The media format conversion device 872 converts the signal data in the temporary media storage device 874 into a streamable format and streams the data to the client device via the web server 854 and the network interface 852.

Figure 9:
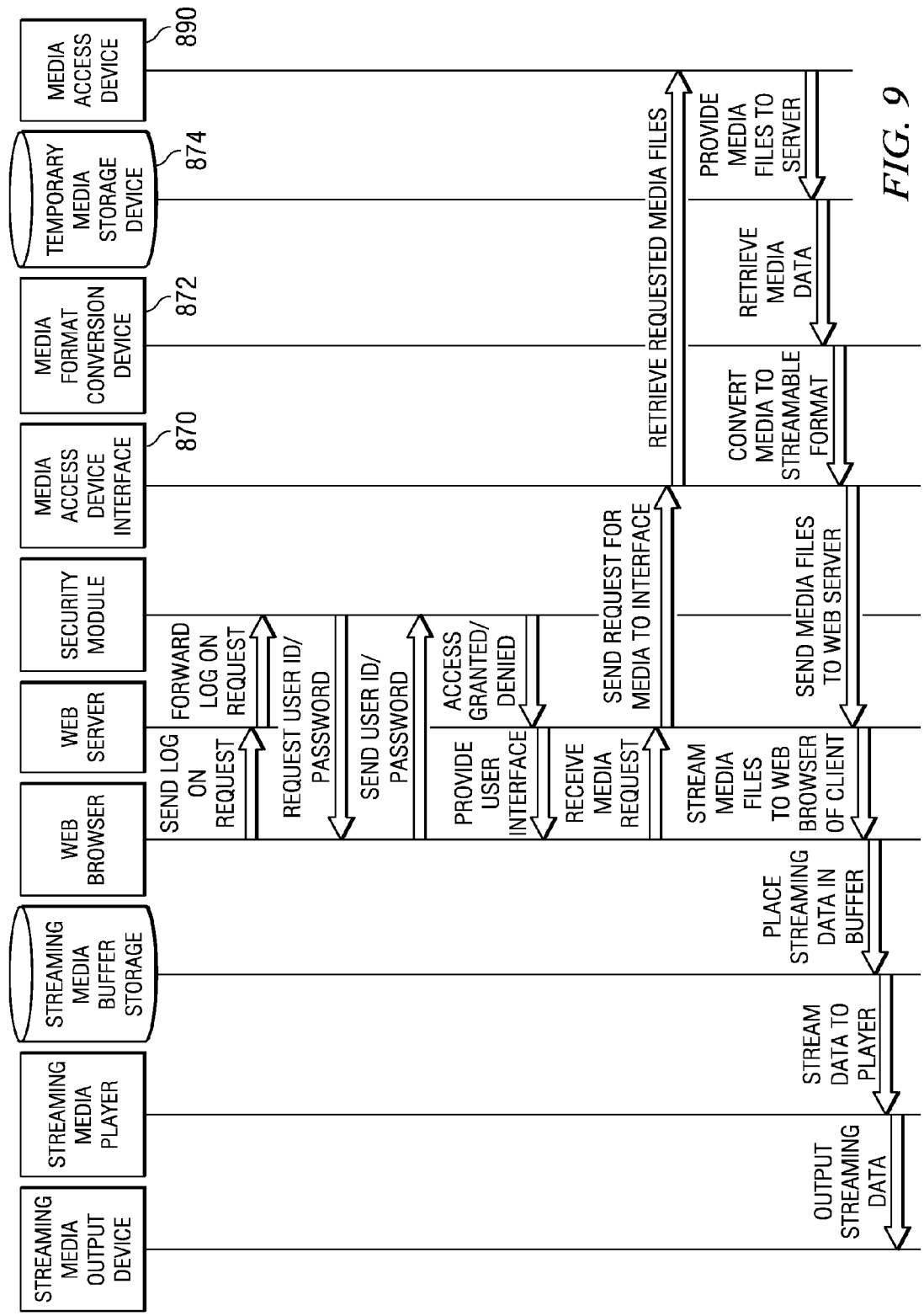
FIG. 9 is an exemplary message flow diagram of the alternative embodiment illustrated in FIG. 8A.

FIG. 9 is an exemplary message flow diagram of the alternative embodiment illustrated in FIG. 8A. As shown in FIG. 9, the message flow is similar to that illustrated in FIG. 5 with the exception that the media is not accessed using a file server and a media file storage device. Rather, as shown, when the request for the media is received, the web server sends the request for the media to the media access device interface 870 which converts the request to an appropriate command signal for the media access device 890. The commands are then sent to the media access device 890 to thereby retrieve the requested media. The media data is provided to the temporary media storage device 874 where the data is temporarily stored until it is converted to a streamable format.

The media data is retrieved from the temporary media storage device 874 and is converted to a streamable format. The media data is then streamed to the client device in a manner similar to that described above with regard to FIG. 5.

Thus, this embodiment of the present invention permits on-demand dynamic conversion and streaming of media information from a source recording device to a client device. This embodiment permits the user of a client device to access media in their original format from remote locations yet receive the media as streaming data. Because the entire portion of media need not be stored in a semi-permanent storage in the streaming format prior to streaming to a client device, the present invention according to this embodiment reduces the amount of data storage capacity that is necessary for implementing the present invention.

Figure 10:
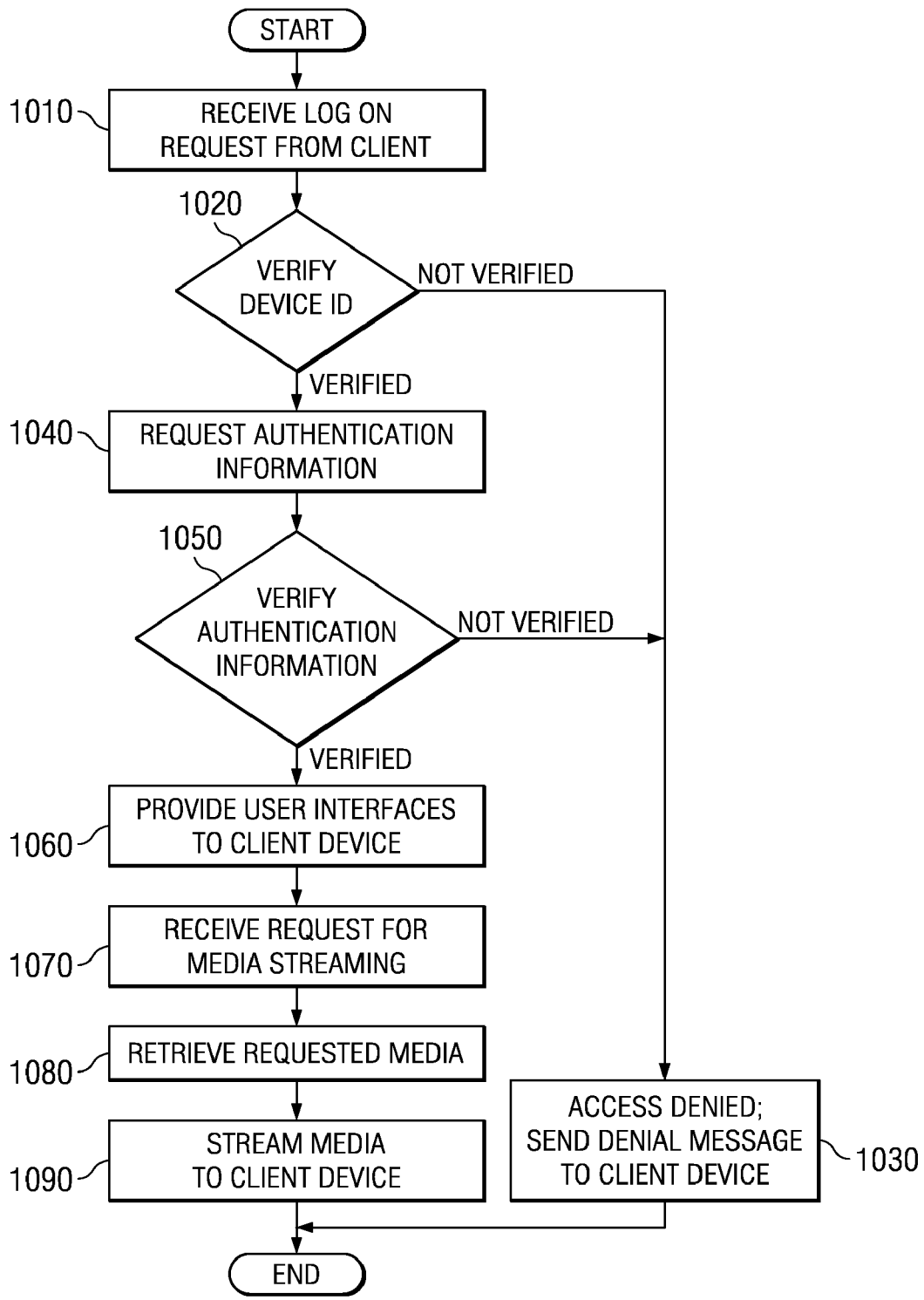
FIG. 10 is an exemplary flowchart outlining an exemplary operation of the present invention.

FIG. 10 is a flowchart that illustrates an exemplary operation of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustrations can be implemented by special purpose hardware-based computer systems which perform the specified functions or steps, or by combinations of special purpose hardware and computer instructions.

As shown in FIG. 10, the operation starts by receiving a log-on request from a client device (step 1010). A device identifier is received in the log-on request and is verified against stored information identifying the device identifiers of authorized devices (step 1020). If the device identifier does not match an authorized device, access is denied and a denial message is returned to the client device (step 1030). If the device identifier matches an authorized client device, a request for authentication information is sent to the client device (step 1040). This authentication information may include, for example, a user ID/password and/or a digital certificate or other authentication data readable from a removable security media.

The authentication information is received and verified against stored authentication information (step 1050). In some embodiments, this may involve decrypting the authentication information using a private key, hash function, or the like, prior to performing the verification. If the authentication information is not valid, the access attempt is denied and a denial message is returned to the client devices (step 1030). If the authentication information is valid, the log-on request is accepted and one or more user interfaces are provided to the client device for entry of media that the user of the client device wishes to have streamed (step 1060).

A request for media is generated based on the user's input to the user interfaces and is received (step 1070). The media identified in the request are then identified and retrieved from a media source (step 1080). The media source may be, for example, a media library storage device in which media is already stored in a streamable format or a media access device that sends signals from the media which are then converted to a streamable format. The received media is temporarily stored in a memory and is then streamed to the client device (step 1090). The client device receives the media stream and outputs it via a streaming media output device.

Thus, the present invention provides a mechanism by which a private library of media may be accessed from remote locations by way of a personal private on-demand media streaming server. Only the owner, and persons explicitly authorized by the owner, may gain access to the media through the use of various security mechanisms. Furthermore, the owner, or select individuals that have been granted explicit permission by the owner, may access the personal private on-demand media streaming server only from pre-registered client devices.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An on-demand media streaming system, comprising:
a media library storage device storing media of a user of a client device;
an on-demand media streaming server coupled to the media library storage device; the client device coupled to the on-demand media streaming server via a private communication link; and
a security unit in the on-demand media streaming server for authenticating both the client device and the user of the client device to form an authenticated client device and an authenticated user such that only the authenticated user using the authenticated client device is enabled to access the media library storage device via the on-demand media streaming server, wherein the on-demand media streaming server, in response to a request for media content from the authenticated user using the authenticated client device, streams the requested media content to the authenticated client device,
wherein the on-demand media streaming server includes a removable medium read/write device, wherein the on-demand media streaming server writes a data structure stored by the on-demand media streaming server to a removable medium in a removable medium read device via the removable medium read/write device, and wherein the data structure stored by the on-demand media streaming server is associated with at least one portion of a set of media in the media library storage device, wherein the client device includes the removable medium read device, wherein the on-demand media streaming server requests a data structure stored by the removable medium in the removable medium read device, wherein access to the media library storage device is enabled only in response to the data structure stored by the removable medium in the removable medium read device matching the data structure stored by the on-demand media streaming server, and, wherein the removable medium is one of a smart card, a floppy disk, a USB drive, a memory stick, and a compact flash memory.

2. The system of claim 1, further comprising:

a device identifier associated with the client device and registered with the on-demand media streaming server, the security unit authenticating the client device only in response to the device identifier being registered with the on-demand media streaming server.

3. The system of claim 2, wherein the device identifier is one of a MAC address of a network card associated with the client device and a Mobile Identification Number of the client device.

4. The system of claim 2, wherein the device identifier is only registrable with the on-demand media streaming server locally, and wherein the security unit authenticates the user using personal information about the user.

5. The system of claim 1, further comprising a graphical user interface for requesting the media content, the graphical user interface requesting the media content by identifying at least one of a media file, a play list, a media streaming schedule, and a quality of a media stream to be provided.

6. The system of claim 1, wherein the on-demand media streaming server streams the requested media to the client device by dynamically retrieving, in response to the request from the client device, media content from the media library storage device, converting the media content to a streamable format, and streaming the converted media content to the client device.

7. The system of claim 1, wherein the media library storage device is one of a compact disc player, a DVD player, a television, a cable television receiver, a satellite television receiver, a hard-disk based television recorder, and a video cassette recorder.

* * * * *